United States Patent [19]

Trusiani

[11] Patent Number: 5,369,553
[45] Date of Patent: Nov. 29, 1994

[54] ILLUMINATED PANEL DEVICE AND METHOD OF MANUFACTURE

[76] Inventor: Paul J. Trusiani, 420 Ravina St., La Jolla, Calif. 92037

[21] Appl. No.: 874,118

[22] Filed: Apr. 24, 1992

[51] Int. Cl.$^5$ .............................................. G09F 13/18
[52] U.S. Cl. ........................................ 362/31; 362/812; 40/546
[58] Field of Search ................. 362/31, 806, 809, 812, 362/26; 40/546, 569, 547; 219/121.72

[56] References Cited

U.S. PATENT DOCUMENTS

| | | | |
|---|---|---|---|
| 2,177,641 | 10/1939 | Evans | 40/546 |
| 2,623,313 | 12/1952 | Fuchs | 40/546 |
| 2,758,401 | 8/1956 | Wilson . | |
| 2,994,971 | 8/1961 | Meisenheimer et al. | 40/546 |
| 3,957,350 | 5/1976 | Kulpa | 40/546 |
| 4,276,705 | 7/1981 | Barth et al. | 40/579 |
| 4,449,941 | 5/1984 | McGuire et al. | 434/153 |
| 4,458,133 | 7/1984 | Macken | 219/121.72 |
| 4,467,168 | 8/1984 | Morgan et al. | 219/121.72 |
| 4,791,745 | 12/1988 | Pohn | 40/546 |
| 4,918,578 | 4/1990 | Thompson | 40/547 |
| 5,138,783 | 8/1992 | Forsse | 40/546 |
| 5,168,143 | 12/1992 | Kobsa et al. | 219/121.72 |

FOREIGN PATENT DOCUMENTS

| | | | |
|---|---|---|---|
| 901508 | 7/1945 | France | 40/546 |
| 740794 | 9/1943 | Germany | 40/546 |
| 277177 | 8/1951 | Switzerland | 40/546 |
| 626240 | 7/1949 | United Kingdom | 40/546 |

OTHER PUBLICATIONS

Edmund Telescopes/Astronomy Aids brochure.
Arrow $CO_2$ Industrial Lasers advertisement, *The Fabricator*, Coherent General, Oct. 1991.

*Primary Examiner*—Richard R. Cole
*Assistant Examiner*—Y. Quach
*Attorney, Agent, or Firm*—Brown, Martin, Haller & McClain

[57] ABSTRACT

An illuminated display panel of light transmitting material has a selected pictorial representation cut into its surface in the form of a series of cut-out lines with at least one gap or bridge of uncut material along the length of each line. The lower edge of the panel is supported in a base lighting fixture which is arranged to base light the panel so that light is transmitted upwardly through the panel to illuminate each of the cut lines so that they stand out from the remainder of the panel to provide an illuminated line display. The pictorial representation is formed in a laser cutting process.

5 Claims, 2 Drawing Sheets

ILLUMINATED PANEL DEVICE AND METHOD OF MANUFACTURE

BACKGROUND OF THE INVENTION

This invention relates generally to pictures for display purposes, such as artistic representations, maps and other pictorial displays, and is particularly concerned with an illuminated panel device.

Paintings, photographs, maps and the like are often hung on walls or otherwise displayed in order to enhance the appearance of a room and appeal to the eye. However, these do not necessarily stand out and immediately attract the eye, particularly if the room is darkened. In my U.S. Pat. No. 5,226,725 entitled "Illuminated Map Device", which was filed Dec. 23, 1991, a back-lit illuminated panel device and an illuminated globe are described, which have an attractive and pleasing appearance in a darkened room.

SUMMARY OF THE INVENTION

It is an object of the present invention to provide a new and improved pictorial display device.

According to one aspect of the present invention, an illuminated panel device is provided which comprises a flat panel of light transmitting material having a lower edge and an upper edge, the panel having a plurality of linear cut-outs in a predetermined pattern to form a selected pictorial representation, and a base housing containing a light source and having an upper wall with a seat or groove for receiving the lower edge of the panel and supporting the panel in an upright orientation, the seat having a window extending along the lower edge of the panel for allowing light to be transmitted from the source through the panel, where it is reflected from the edges of the cut-outs, tending to illuminate the lines and make them stand out from the remainder of the panel material.

The pictorial representation may be a map, a picture such as a sunset, mountain scene or the like, a pattern, or any other artistic representation which can be represented by a line drawing. When the panel is base lit from the base housing, the light will travel through the panel and illuminate all the cut outs, providing a very attractive appearance, particularly in a darkened room.

The linear cut-outs are arranged to follow the desired contours of the representation. Each continuous linear cut-out will have at least one bridge in its length where the material is not cut, and in most cases a plurality of bridges or gaps are provided at spaced intervals in each linear cut out, in order to maintain the integrity of the panel so that no parts will be completely separated from the remainder of the panel.

The panel is preferably of plexiglass or similar material which is laser cut to the desired specifications.

According to another aspect of the present invention, a method of making a display panel is provided, which comprises the steps of choosing a pictorial representation for display, tracing the lines of the representation onto another sheet leaving at least one gap in each continuous line, scanning the traced image with gaps into a laser cutting control system, and laser cutting the traced lines onto a panel of light transmitting material leaving at least one gap in each continuous line.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

The drawings illustrated an illuminated panel device 10 according to a preferred embodiment of the invention. The device 10 basically comprises a flat rectangular panel 12 of light transmitting material which may be transparent or translucent, such as plexiglass or similar materials, on which a selected pictorial representation 14 has been cut in the form of a series of cut-out lines 16 extending along the contours of the representation. In the illustrated embodiment, the representation is in the form of a map, but it will be understood that other artistic representations may be displayed in an equivalent manner, for example scenic pictures such as skylines, mountains and so on, with the only limitation being that the representation must be capable of reduction to a line drawing.

Figure 3:
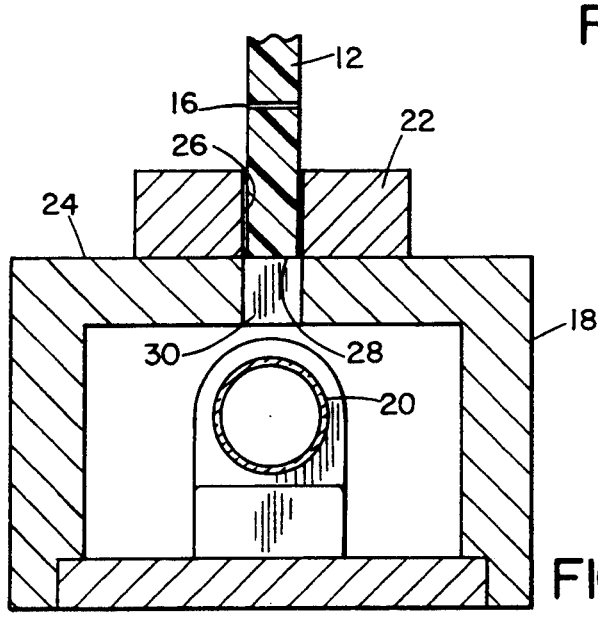
FIG. 3 is an enlarged sectional view taken on line 3—3 of FIG. 1.

The panel 12 is supported in base housing 18 which is a hollow rectangular housing containing a suitable light source 20, as illustrated in FIG. 3. A raised ridge or strip 22 extends along the upper wall 24 of the housing, with a channel or groove 26 running along the strip 22 for receiving the lower edge 28 of the panel to support the panel in an upright orientation, as illustrated in FIG. 3. A slit-like transparent window or opening 30 is provided in upper wall 24 in alignment with and extending along the length of channel 26 for allowing light to be transmitted through the upper wall 24 to base light the panel 12.

The light source 20 may be a strip light as illustrated, or any other type of light source, and may be white or colored light. The light source is connected to a suitable power supply which may be an internal battery. Alternatively, a power input for connection to the mains power supply is provided.

Figure 4:
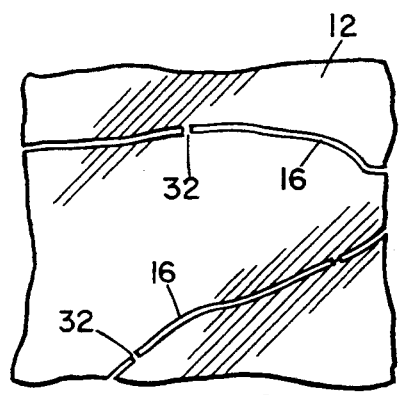
FIG. 4 is an enlargement of a portion of the illuminated panel, showing the cutting lines and connecting bridges.

Each pair of adjacent cut-out lines 16 extending along a contour is separated by a bridge or gap 32 where the panel material is uncut, as illustrated in FIG. 4. Normally, a series of spaced lines 16 separated by bridges 32 will be provided along each continuous contour of the representation. The purpose of bridges 32 is to maintain the integrity of the panel and ensure that any parts which are completely surrounded by cut-out lines will still be secured to the remainder of the panel, for example the continents 34 illustrated in FIG. 1. The number of gaps or bridges in each contour will be dependent on the complexity of the contour and the size of the area surrounded, with more complex contours generally needing a larger number of gaps and smaller areas generally needing fewer gaps. Small cut out areas or openings 36 may also be provided in the panel if the representation includes features which are too small to be formed by a peripheral line, for example small lakes or islands on a map. The panel is preferably at least ¼ inch thick acrylic or plexiglass material, which is easy to laser cut and relatively durable.

Figure 1:
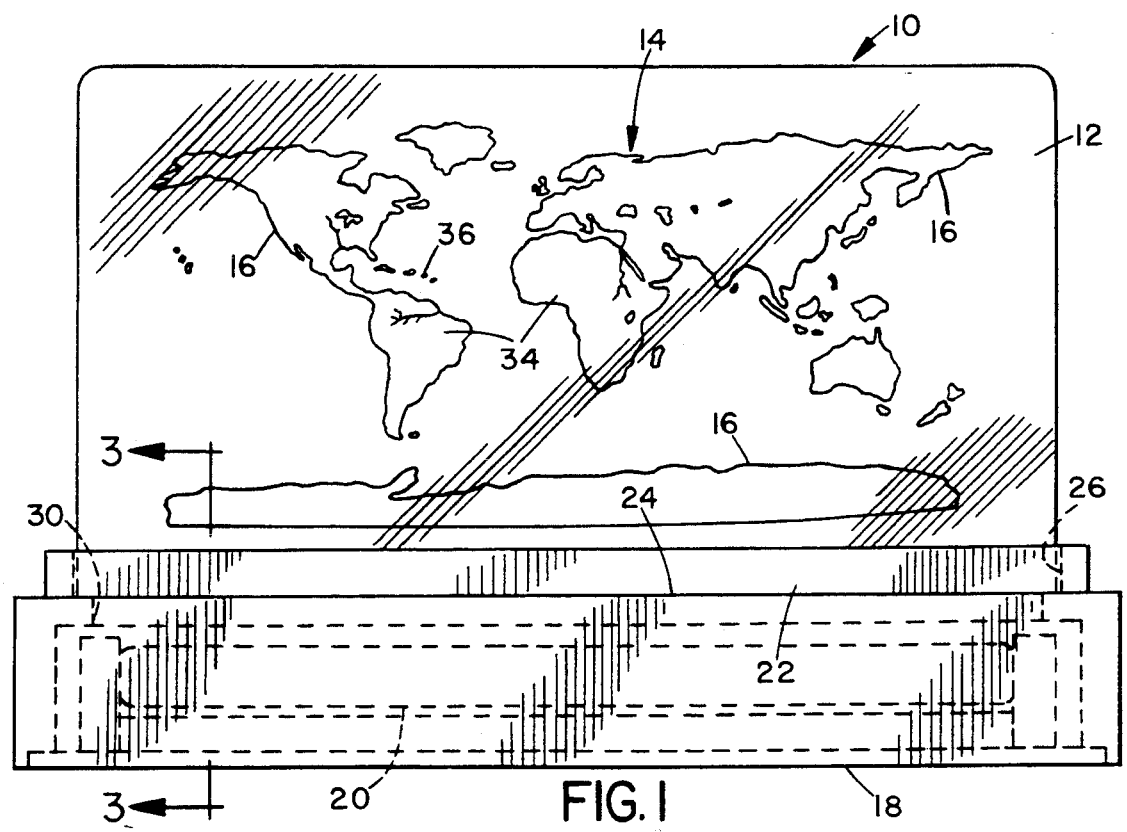
FIG. 1 is a front elevation view of the illuminated panel unit according to a preferred embodiment of the invention.
Figure 2:
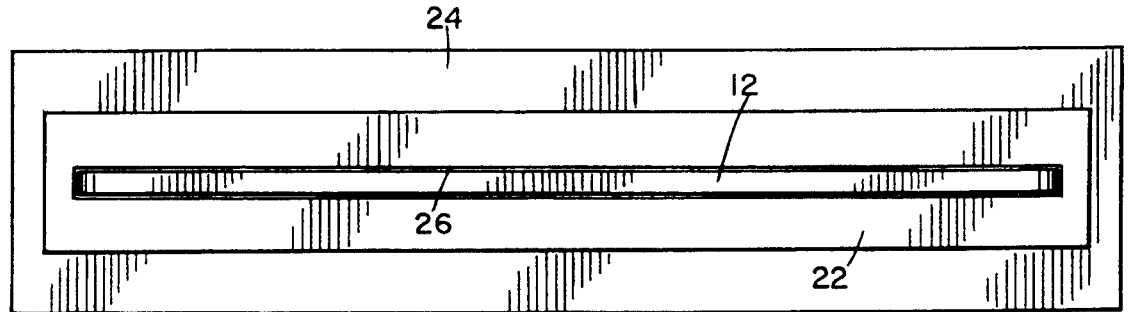
FIG. 2 is a top plan view of the unit.

When the panel is supported in the base housing as illustrated in FIG. 1, it will be base-lit by the light source. Light will be transmitted upwardly through the panel and will be reflected from the edges of the cut lines, tending to illuminate all of the line contours so that they stand out in a dramatic and attractive manner from the remainder of the panel.

Figure 5:
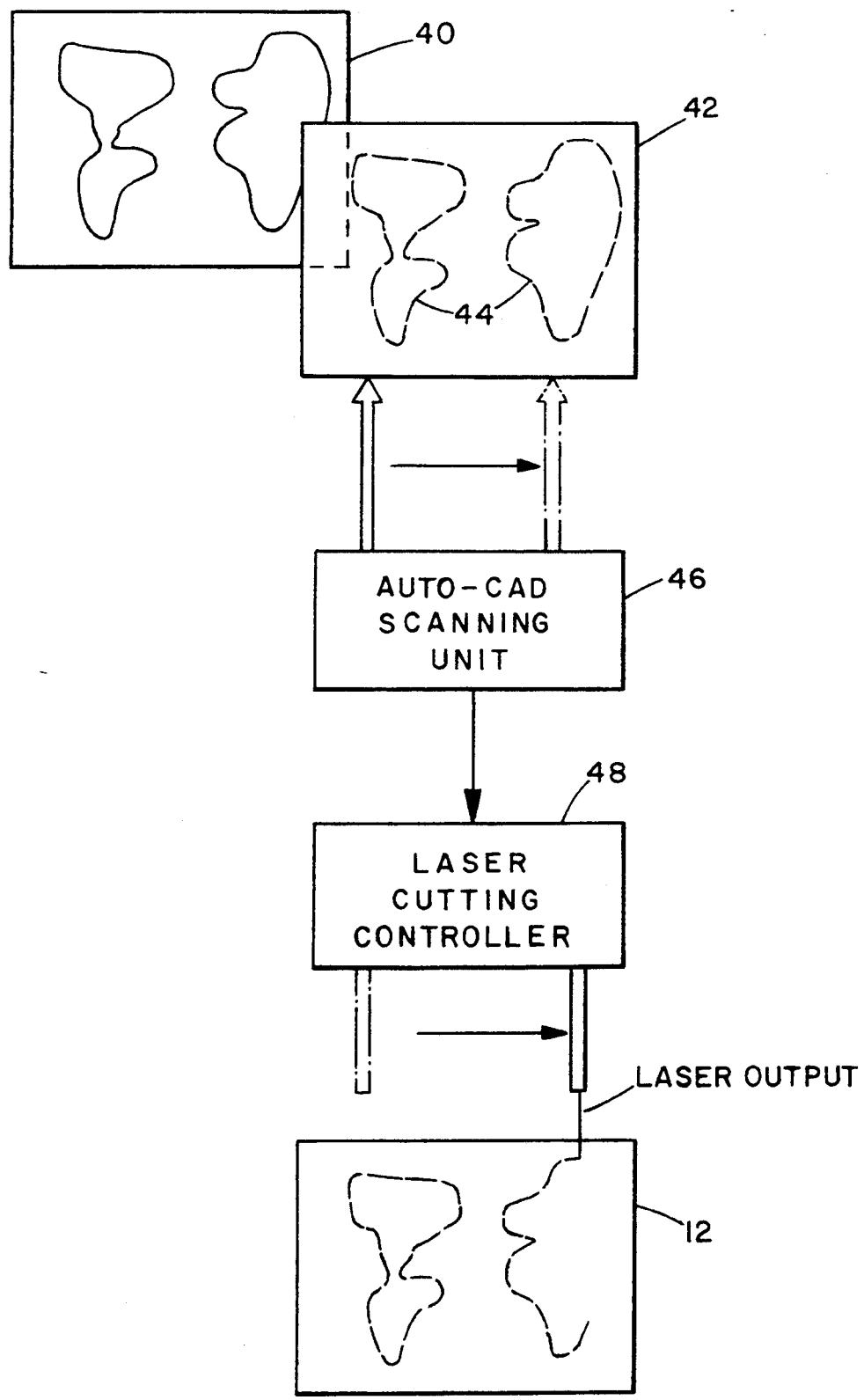
FIG. 5 is a schematic illustration of the method of making the laser cut display panel for use in the unit of FIGS. 1–3.

The panel may be made by a laser cutting process, as schematically illustrated in FIG. 5. In this procedure, a pictorial representation 40 for display is first selected. This may be a map of any area of the world or an entire world map, a photograph or a picture of anything that can be reduced to a line drawing. The selected picture is then traced onto a sheet of paper or the like 42 by tracing lines around all the contours of the picture, leaving one or more gaps 44 in each traced line. The drawing may be simplified if necessary to leave out any unnecessary details or details which would be difficult to laser cut quickly and accurately.

This produces a traced image of the representation which may be scanned or digitized into a suitable computer system such as an auto-cad drawing system 46, and the scanned or digitized data is then converted into standard laser cutting control software in a laser cutting controller 48 as is conventionally used in automated laser cutting systems. The scanned and converted data consisting of the traced lines with periodic gaps is then used to control a laser to cut the contours into a panel 12 of the selected material. The laser will cut lines into the panel along the predetermined contours, leaving gaps or bridges at the programmed positions in each line, as illustrated in FIG. 4. This allows display panels carrying any desired line contour to be made quickly and easily.

The display panel formed in this way may be mounted in a base light fixture and base lit as described above, or may alternatively be back lit by mounting across the front of a suitable light housing.

Although a preferred embodiment of the invention has been described above by way of example only, it will be understood by those skilled in the field that modifications may be made to the disclosed embodiment without departing from the scope of the invention, which is defined by the appended claims.

I claim:

1. An illuminated panel device, comprising:
   a flat panel of light transmitting acrylic material having a lower edge and an upper edge and a thickness of at least ¼ inch;
   the panel having a plurality of cut-out lines in a predetermined arrangement to form a selected pictorial representation;
   a base housing having an upper wall with a seating means for receiving the lower edge of said panel to support said panel in an upright orientation;
   a light source in said housing;
   the upper wall having a completely transparent window extending along the lower edge of the panel for allowing light from the light source to be transmitted through the panel and to be reflected from the edges of said cut-out lines to thereby illuminate said pictorial representation so that it stands out from the remainder of the panel; and
   the pictorial representation comprising a map having selected topographical features and the cut-out lines extend along the contours of the selected topographical features.

2. The device as claimed in claim 1, wherein a series of cut-out lines extend along at least some of the contours, and a bridge of uncut panel material is formed between each adjacent pair of cut-out lines extending along a respective contour.

3. The device as claimed in claim 2, wherein the distance between adjacent bridges in a contour being much greater than the length of a bridge.

4. An illuminated panel device, comprising:
   a flat panel of light transmitting material having a lower edge and an upper edge;
   the panel having a plurality of cut-out lines in a predetermined arrangement to form peripheral edges of large features in a selected pictorial representation and a plurality of cut-out, non-linear openings representing smaller features of the pictorial representation;
   a base housing having an upper wall with a seating means for receiving the lower edge of the panel to support the panel in an upright orientation;
   a light source in said housing; and
   the upper wall having a window extending along the lower edge of the panel for allowing light from the light source to be transmitted through the panel and to be reflected from the edges of said cut-out lines and non-linear openings to thereby illuminate said pictorial representation so that it stands out from the remainder of the panel.

5. The device as claimed in claim 4, wherein the selected pictorial representation is a map having topographical features including continents, small islands and lakes, the cut-out lines forming the peripheries of the continents and the cut-out, non-linear openings forming the small islands and lakes.

* * * * *